Jan. 30, 1962  R. J. DEISENROTH  3,018,525
GLASS RUN FOR WINDOWS

Filed May 5, 1960  3 Sheets-Sheet 1

INVENTOR.
ROBERT J. DEISENROTH
BY
WILSON, LEWIS & McRAE
ATTORNEYS

Jan. 30, 1962   R. J. DEISENROTH   3,018,525
GLASS RUN FOR WINDOWS
Filed May 5, 1960   3 Sheets-Sheet 2
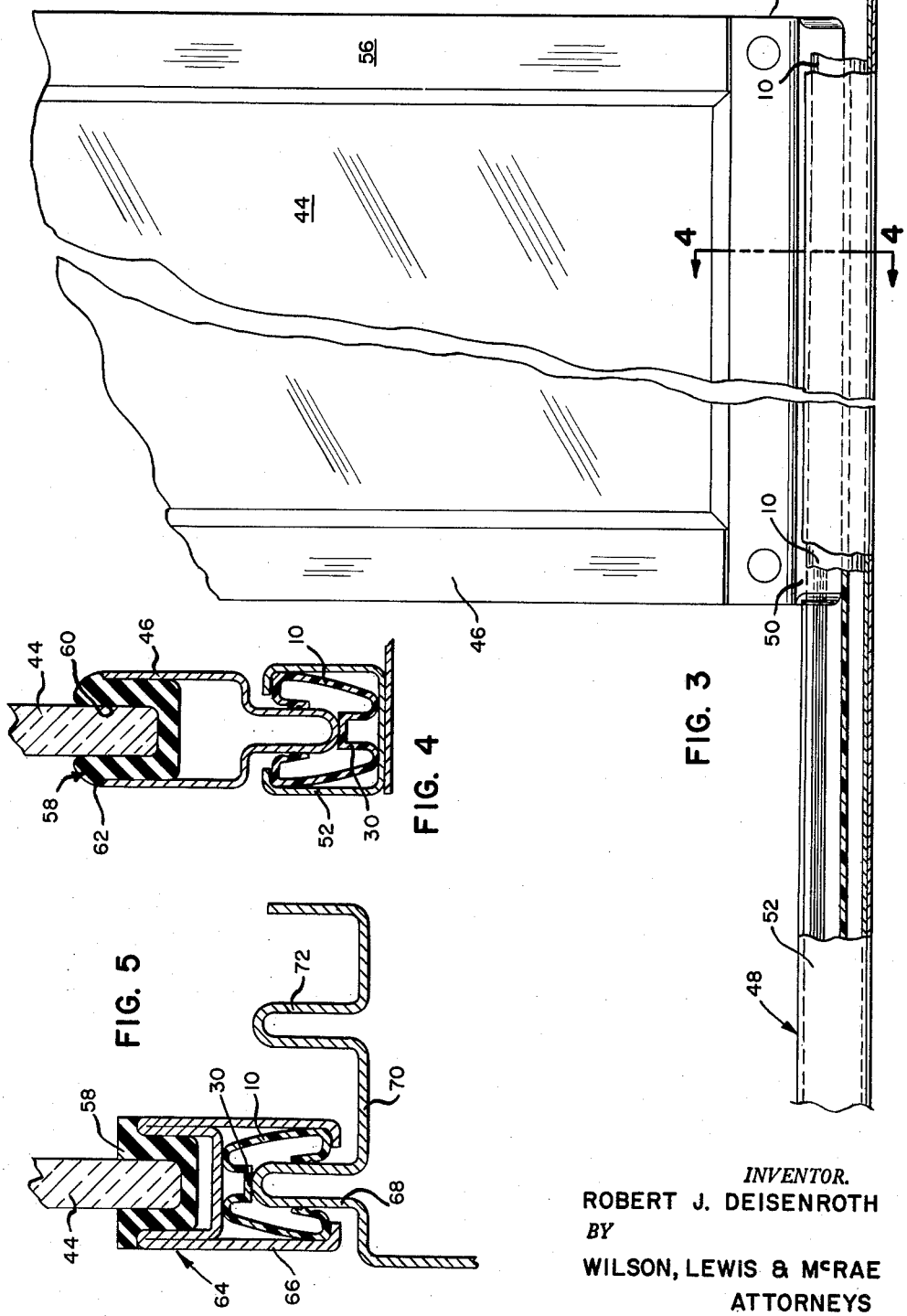
INVENTOR.
ROBERT J. DEISENROTH
BY
WILSON, LEWIS & McRAE
ATTORNEYS Jan. 30, 1962 R. J. DEISENROTH 3,018,525
GLASS RUN FOR WINDOWS Filed May 5, 1960 3 Sheets-Sheet 3

INVENTOR.
ROBERT J. DEISENROTH
BY
WILSON, LEWIS & McRAE
ATTORNEYS

United States Patent Office 3,018,525
Patented Jan. 30, 1962

3,018,525
GLASS RUN FOR WINDOWS
Robert J. Deisenroth, 165 Marshall Blvd., Elkhart, Ind.
Filed May 5, 1960, Ser. No. 27,071
6 Claims. (Cl. 20—52)

This invention relates to a glass run for windows, and more particularly to a glass run fabricated from a plastic material and which will effectively serve as a weather strip and mounting for sliding windows.

A glass run, as defined herein, refers to a weather-stripping element which may be secured either to a window frame or to a window sash. As indicated by the use of the word "run" the glass run member is particularly useful in connection with sliding windows such as those provided in buses, automobiles, aircraft and other vehicles. However, the glass run also finds application wherever such windows may be used, for example, in building structures, cabinets, and the like. In addition, the glass run can be used to receive the non-sliding portion of windows, for example, the upper edge of wind-up windows such as are provided in the side doors of automobiles.

In the past, glass runs have been fabricated from such materials as wool or nylon pile, cloth, felt, flocked rubber, and various rubberized fabrics. The substitution of plastic for these materials has long been desired because of the desirable properties of plastic, such as imperviousness to moisture and gases, durability, ease of manufacture, and low cost. However, problems have been encountered in the construction of a suitable plastic glass run. For example, it has been difficult to obtain a good seal between the plastic and the glass to prevent the passage of air and moisture. Another difficulty has been the provision of a low-friction sliding action between the glass run and the mating sliding member.

It is, therefore, an object of this invention to provide a glass run fabricated from a plastic material.

Another object of the invention is to provide a glass run which will form a good seal with a member inserted therein to prevent the ingress of air, moisture or dirt.

A further object of the invention is to provide a glass run which is mountable in a retaining-channel and will form a seal with the retaining-channel to prevent the passage of foreign matter therearound.

Another object of the invention is to provide a glass run which has a low-friction surface to provide a smooth sliding contact with a member inserted therein.

A still further object of the invention is to provide window structures which are used in combination with the glass run.

Another object is to provide a guide structure in the glass run to space apart the metal portions of a window sash and a window frame so as to prevent sliding contact therebetween.

A further object is to provide a corner sealer element to be used in combination with the aforementioned glass run where rounded corners are encountered in windows.

Other objects of this invention will appear in the following description and appended claims, reference being had to the accompanying drawings forming a part of this specification wherein like reference characters designate corresponding parts in the several views.

In the drawings:

FIG. 3 is a side elevational view of a sliding window construction in which the glass run of FIG. 1 is mounted in a window frame having a substantially right angular corner portion;

FIG. 4 is a sectional view taken substantially along the line 4—4 of FIG. 3 looking in the direction of the arrows;

FIG. 5 is a cross-sectional view similar to FIG. 4 of another embodiment of a window construction in which the glass run is mounted on the window sash and rides on a tongue provided on the window frame;

Figures 1, 2:
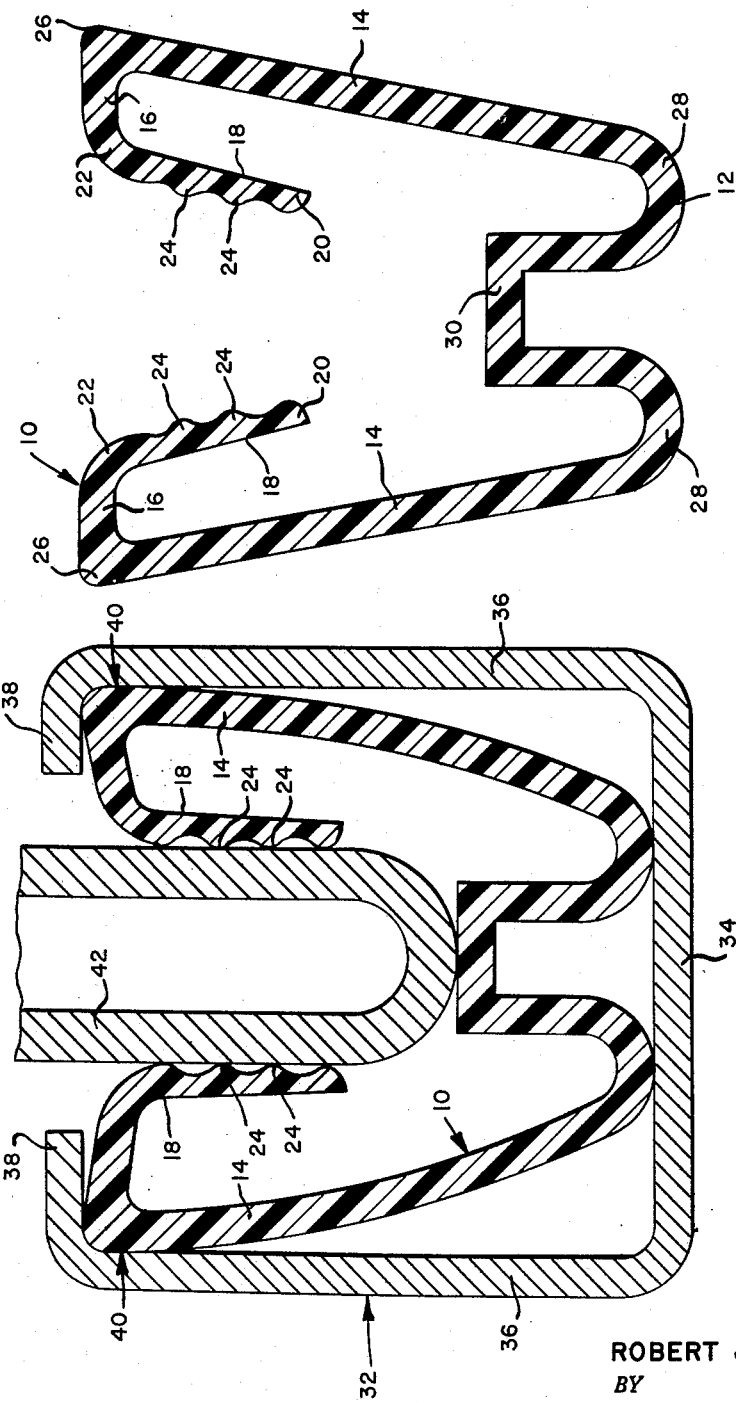
FIG. 1 is a cross-sectional view of one embodiment of the glass run of the present invention.
FIG. 2 is an embodiment showing the combination of the glass run of FIG. 1 with a retaining-channel and a member inserted into the glass run.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

All of the glass run embodiments shown in the drawings comprise a continuous strip fabricated from an organic polymeric material. The plastic should have such physical properties as impermeability to moisture and air, toughness, stability, and a low coefficient of friction. The material should not be brittle, as it should be able to yield under pressure and return to its original shape upon the release of pressure. A preferred organic polymeric material is a rigid polyvinyl chloride of the unplasticized type. Additives, such as pigment and fillers, as commonly used in the plastic art may be employed with the material. In particular, a lubricant may be provided in the plastic material to reduce its coefficient of friction.

The continuous strip may be formed by any well-known extrusion process. In extruding the strip, it is desirable to keep the surface as smooth as possible in order to reduce the coefficient of friction and prevent sticking and squeaking when a member is in sliding contact therewith. The strips can be coated with suitable lubricant materials to avoid such squeaks and to promote a smooth sliding action.

Referring to FIG. 1, it may be seen that the glass run 10 has a channel-shaped cross-sectional contour comprising a bottom wall 12 and a pair of side walls 14 extending outwardly therefrom. Each of the side walls has an inwardly extending lip 16 at its outer end. A flange 18 extends from each lip towards the bottom wall 12. The flanges 18 are angled inwardly from the lip so that they are spaced closer together at their outer ends 20 than at their point of attachment 22 with the lip portion. As will be noted, the thickness of the flanges 18 is gradually reduced from their point of attachment 22 to their outer ends 20. This reduced thickness permits the flanges to be deformed by bending without causing permanent deformation as will hereinafter be more fully explained. A plurality of spaced longitudinally extending ribs 24 are provided on the oppositely disposed faces of the flanges 18.

The number of such ribs is shown as three, however, the number may be varied as desired.

As will be noted, the side walls are angled outwardly so that they are spaced further apart at their outer ends 26 than at the point of their attachment 28 with the bottom wall. The bottom wall is formed with a projection 30 which extends towards the lip portions 16.

As may be seen in FIG. 2, the glass run 10 is adapted to be mounted in a retaining-channel 32. The channel 32 is U-shaped having a bottom wall 34 and substantially parallel side walls 36. Each side wall 36 is provided at its outer end with an inwardly directed flange or lip 38. The spacing between the upper portion of the glass run side walls 14 is greater than the distance between the side walls 36 of the channel whereby insertion of the glass run into the channel will cause the glass run walls to yieldingly contact the channel side walls to form a sealing engagement as at 40. This sealing engagement is sufficient to prevent the ingress of air, moisture or other foreign matter between the channel walls and the glass run walls.

The glass run in adapted to receive a member 42 between the side walls 14 in pressure engagement with the ribs 24. The member 42 may be, for example, a tongue secured to a window sash frame or a tongue secured to a window frame. It may also be a section of unframed glass.

As may be seen in FIG. 2, the member 42 deflects the flanges 18 out of their normal position so that a sealing engagement is formed between the ribs 24 and the member 42. This seal is desirable to keep foreign matter out. For example, the passage of air around a window joint is always a problem, particularly with windows used in vehicles which travel at high speed. The provision of a plurality of ribs provides a plurality of restrictions to the passage of air. As in the case of any gas, there will be a pressure drop across each restriction. The pressure drop across the first restriction is, of course, designed to be very high. Consequently, any air which does pass by the first rib will be under a greatly reduced pressure. Therefore, very little of this air will pass through the second restriction. The number of ribs provided on a particular glass run will depend in large measure on the conditions under which the glass run is to be used. If the glass run is to be used on a window installation in an airplane, it would likely be desirable to provide the four restrictions shown. However, if the glass run is to be used on a fixed structure such as a house, two restrictions would likely be sufficient.

The purpose of tapering the flanges 18 may be understood by a consideration of the deflection which they undergo and the physical characteristics of the plastic material from which they are fabricated. Organic polymeric materials, such as the preferred polyvinyl chloride, have relatively low elastic limits. Consequently, when bending such materials, provision must be made to avoid permanent deformation, which in the present invention would result in a defective window seal. As may be seen in FIG. 2, the portions of the flanges 18 remote from the attachment point 22 undergo the greatest deflection. However, the strain of these portions is reduced by reducing the thickness of the material. Reduction in strain reduces the possibility of exceeding the elastic limit because strain is directly related to this factor. Secondly, by tapering the wall thickness, the flanges are caused to bend along their entire length rather than at a single point. The consequence is that the strain will be distributed over the entire flange rather than at one point. Such distribution also lessens the possibility of exceeding the elastic limit of the material.

The combination of the glass run 10 with a horizontally slidable window is shown in FIG. 3. A window glass 44 is mounted in a window sash frame 46. The sash is slidably mounted in a window frame track 48 by means of a tongue 50 provided along one outer edge of the sash. As will be appreciated, a similar arrangement is provided on the upper portion of the window not shown in the figure. The track 48 comprises a retaining-channel 52 carried on a support element 54. A glass run is mounted within the channel in the manner illustrated in FIG. 2. The window construction is also provided with a vertical track member 56 which also carries a glass run 10. The vertical portion of the window sash frame also has a tongue insertable into the vertical track member. As will be readily appreciated, the sash may be slid horizontally along the track 48 to open or close the window. Upon closing, the vertical track 56 receives the vertical tongue to provide a continuous seal around the window.

A cross-sectional view of the above-described construction is illustrated in FIG. 4. As may be noted in FIG. 4, the window glass 44 is glazed to the sash frame 46 by means of conventional resilient sealing member 58.

Another embodiment of a window combination utilizing the glass run 10 is illustrated in FIG. 5. As thereshown, the glass run 10 is secured to the window sash frame 64 and is movable therewith. The glass run 10 is retained in a channel portion 66 similarly to the FIG. 4 embodiment. A tongue 68 is provided on the window frame track member support 70 and is inserted in the channel of the glass run 10 whereby the sash 64 is slidable therealong. A second tongue 72 is provided adjacent the tongue 68. The tongue 72 is adapted to support a second sash member, such sashes commonly being used in pairs whereby either one may be moved to open the window.

It will be noted in both FIGS. 4 and 5 that there is no metal-to-metal contact between the slidable sash and the track support member. The projection 30 spaces these elements apart. Such metal-to-metal contact is undesirable when the windows are moved because it tends to gall the metal and make the window difficult to slide. This problem is especially troublesome when aluminium is used as the metal for the sash and track components. Aluminum will gall very easily to cause a mechanical welding and will cause the windows to eventually stick or freeze in place.

Figure 6:
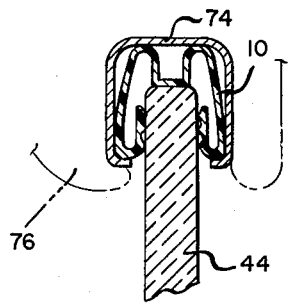
FIG. 6 is another embodiment showing a structure similar to FIG. 4 but where the window glass is not provided with a sash frame member.

A third embodiment of the invention is illustrated in FIG. 6. As thereshown, the track is constructed as in FIG. 4 with a retaining-channel 74 and a glass run 10 supported on structure 76. The glass is not provided with a frame, but is mounted directly in the channel of the glass run. While this embodiment is useful as a sliding construction, it is especially useful along the header strip of a vehicle door frame to receive the upper edge of the glass in a wind-up window.

Figure 7:
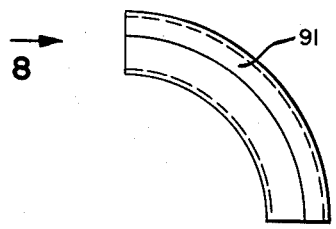
FIG. 7 is a view of a section of a corner sealer element for use on a sash forming another embodiment of the invention.
Figure 8:
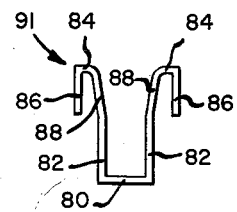
FIG. 8 is a view of the cross-sectional contour of the corner sealer element of FIG. 7 as viewed in the direction of arrow 8.

The element 91 illustrated in FIGS. 7 and 8 may be termed a "corner sealer" glass run. It is different in cross-sectional contour than the FIG. 1 embodiment and is particularly adapted to be molded into a curvature as shown in FIG. 7. The cross-section shown in FIG. 1 is somewhat difficult to mold into such a curvature. Such curvatures may, of course, have many different radii.

Figure 9:
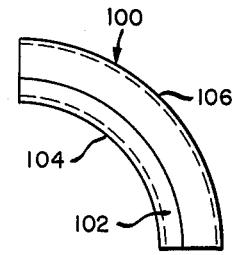
FIG. 9 is a view of the FIG. 7 corner sealer element showing the reverse curve for use on a window frame.

As shown in FIG. 8, the cross-section comprises a bottom wall 80, and upstanding side walls 82 to form a substantially U-shaped section. The side walls 82 are each provided at their upper end with an outwardly directed lip 84. Each lip 84 has a downwardly directed flange 86 at its outer end. The upper portion 88 of the side walls 82 is slanted outwardly whereby the side walls 82 are spaced further apart at their upper ends than at their point of attachment with the bottom wall 80. FIG. 9 illustrates what may be termed the reciprocal curve of FIG. 7. The FIG. 9 element 100 has the flanges 102 extending from the inner curvature 104 with bottom wall 106 being formed on the outer curvature. Element 91 is adapted for use on a sash while element 100 is for use on a window frame.

Figure 10:
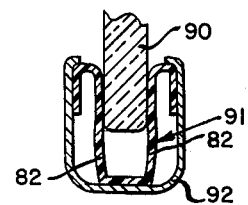
FIG. 10 is a view of the glass run of FIG. 7 in combination with a retaining-channel and with a member inserted therein.

The corner sealer construction is useful as shown in FIG. 10 to provide a seal for a window member 90. As shown, the corner sealer element is inserted into a retaining-channel 92 with the lip and flange portions pressing against the outer walls of the retaining channel to form a seal therewith. Insertion of the member 90 into the channel of the sealer element will tend to bow the side walls 82 to form a seal therewith.

Figure 11:
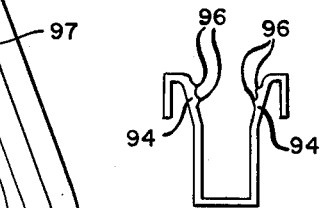
FIG. 11 is a view similar to FIG. 8 and showing another embodiment of the corner sealer element.

An alternate shape for the FIGS. 8 or 9 glass run is illustrated in FIG. 11. As thereshown, the inner surfaces of the upper side wall portions 94 are provided with spaced longitudinally extending ribs 96. The function and operation of these ribs is substantially the same as that previously described for the ribs 24 of the glass run 10.

Figure 12:
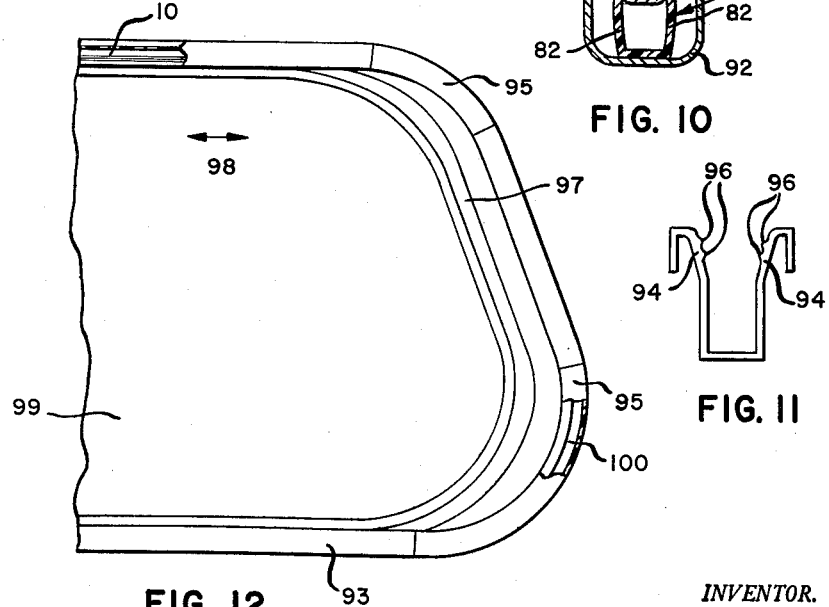
FIG. 12 is a view showing the combination of the glass run member of FIG. 1 with the corner sealer element of FIG. 9.

The combination of the corner sealer element and the glass run 10 is illustrated in FIG. 12. As thereshown, the glass run 10 is provided on the straight portion 93 of a window frame. The corner portions 95 are provided with the corner seal element 100. The straight portion between the corner seal elements is a section of glass run 10. As shown, each of the corner seals has a different radius. In operation of the combination shown, the sash 99 is adapted to be slid in the directions of the arrow 98. The glass run 10 will receive all of the sliding action while the window tongue 97 would merely be inserted into and out of the corner seal element 100. As will be appreciated, the sash may be a framed sash as shown or it may be frameless.

Having thus described my invention, I claim:

1. A window construction for a vehicle comprising sash and frame elements movable slidably relative to one another, one of the elements having a guiding tongue along at least one edge thereof and the other of the elements having a retaining-channel along at least one edge to receive the guiding tongue, the retaining-channel comprising a substantially U-shaped member having a bottom wall with side walls extending therefrom, and a flange portion extending inwardly from the outer ends of the side walls to form a re-entrant opening, a glass run mounted within the retaining-channel, said guiding tongue being slidingly received in the glass run, said glass run comprising a continuous substantially U-shaped strip of organic polymeric material, said strip having a bottom wall with side walls extending therefrom, said side walls of the glass run being spaced further apart at their outer ends than at the point of their attachment with the bottom wall of the glass run, the spacing of the outer ends of the glass run side walls also being greater than the distance between the retaining-channel side walls whereby the upper portions of the glass run side walls yieldingly contact the retaining-channel side walls in sealing engagement therewith at a point adjacent the juncture of the retaining-channel side walls and retaining-channel flange portions, said glass run side walls each having an inwardly extending lip portion at its outer end, and a flange having a gradually reduced thickness extending from each lip towards the glass run bottom wall, said glass run flanges being normally spaced closer together at their free ends than at their point of attachment with the lip portions, and a plurality of spaced longitudinally extending ribs on the oppositely disposed faces of the glass run flanges, said guiding tongue being received between the glass run side walls and pressing against the glass run flanges into sealing engagement with said ribs.

2. A glass run for windows comprising a continuous strip fabricated from an organic polymeric material; said strip having a channel-shaped cross-sectional contour comprising a bottom wall and a pair of side walls extending therefrom; said side walls being spaced further apart at their outer ends than at the point of their attachment with the bottom wall; said side walls each having an inwardly extending lip portion at its outer end; and a flange having a gradually reduced thickness extending from each lip towards the bottom wall; said flanges being spaced closer together at their free ends than at their points of attachment with the lip portions; a plurality of spaced longitudinally extending ribs on the oppositely disposed faces of the flanges; said bottom wall being formed with a projection extending towards the lip portions whereby said glass run is adapted to receive a member between the side walls and abutting against the projection with the flange ribs seating thereagainst in sealing engagement.

3. The window construction claimed in claim 1 and further characterized in that the element having a guiding tongue along at least one edge thereof is the sash; said sash comprising a window glass; the outer marginal edge of said window glass forming the guiding tongue.

4. A window construction as claimed in claim 1 and further characterized in that the window sash has at least one substantially right angular corner; said tongue being provided along each outer edge of the sash extending from the right angular corner; said window frame having a mating corner portion; and said glass run provided in the portions of the frame extending from the mating corner.

5. A window construction as claimed in claim 1 and further characterized in that the window sash has at least one curved corner; said tongue being provided along the outer edge of the sash to extend around the curve; said window frame having a mating curvature; and a corner sealing element provided in the portion of the frame extending around the mating corner; said corner sealing element comprising a continuous strip fabricated from an organic polymeric material; said strip having a channel-shaped cross-sectional contour comprising a bottom wall and a pair of side walls extending therefrom; said side walls each having an outwardly extending lip portion at their outer ends; and a flange extending from each lip towards the bottom wall; the upper portions of said side walls being angled away from each other whereby the side walls are spaced farther apart at their outer ends than at the point of their attachment with the bottom wall; said last-mentioned tongue portion being receivable between the side walls of the corner sealer with the upper portions of the corner sealer side walls yieldingly contacting the tongue with sealing engagement therewith.

6. The device claimed in claim 5 and further characterized in that a plurality of spaced longitudinally extending ribs are provided on the oppositely disposed inner face of the upper portions of the side walls of the corner sealer element; said corner sealer element adapted to receive a member between the side walls with the ribs seating thereagainst in sealing engagement.

References Cited in the file of this patent

UNITED STATES PATENTS

| 1,594,765 | Axe | Aug. 3, 1926 |
| 1,688,231 | Fisher | Oct. 16, 1928 |
| 1,922,009 | Axe | Aug. 8, 1933 |
| 2,908,949 | Frehse | Oct. 20, 1959 |

FOREIGN PATENTS

| 818,907 | Germany | Oct. 29, 1951 |
| 769,877 | Great Britain | Mar. 13, 1957 |